US012380334B2

(12) United States Patent
Richter et al.

(10) Patent No.: US 12,380,334 B2
(45) Date of Patent: Aug. 5, 2025

(54) OBJECTIVE-EFFECTUATORS IN SYNTHESIZED REALITY SETTINGS

(71) Applicant: Apple Inc., Cupertino, CA (US)

(72) Inventors: Ian M. Richter, Los Angeles, CA (US); Amritpal Singh Saini, San Jose, CA (US); Olivier Soares, Oakland, CA (US)

(73) Assignee: Apple Inc., Cupertino, CA (US)

( * ) Notice: Subject to any disclaimer, the term of this patent is extended or adjusted under 35 U.S.C. 154(b) by 899 days.

(21) Appl. No.: 17/070,332

(22) Filed: Oct. 14, 2020

(65) Prior Publication Data

US 2021/0027164 A1 Jan. 28, 2021

Related U.S. Application Data

(63) Continuation of application No. 16/955,429, filed as application No. PCT/US2019/014123 on Jan. 18, 2019, now abandoned.
(Continued)

(51) Int. Cl.
*G06N 20/00* (2019.01)
*G06F 16/951* (2019.01)
(Continued)

(52) U.S. Cl.
CPC ............ *G06N 3/088* (2013.01); *G06F 16/951* (2019.01); *G06F 18/217* (2023.01); *G06N 3/04* (2013.01);
(Continued)

(58) Field of Classification Search
CPC ............ G06N 3/088; G06N 3/04; G06N 3/08; G06N 3/004; G06N 3/006; G06N 3/02;
(Continued)

(56) References Cited

U.S. PATENT DOCUMENTS

2006/0195409 A1   8/2006   Sabe et al.
2007/0260567 A1*  11/2007  Funge ............... A63F 13/67
                                                706/47
(Continued)

FOREIGN PATENT DOCUMENTS

CN   106383587 A   2/2017
CN   107111361 A   8/2017
(Continued)

OTHER PUBLICATIONS

Sawa, Manolis, et al. "SceneGrok: Inferring action maps in 3D environments." ACM transactions on graphics (TOG) 33.6 (2014): 1-10 (Year: 2014).*
(Continued)

*Primary Examiner* — Andrew T McIntosh
(74) *Attorney, Agent, or Firm* — Fernando & Partners, LLP

(57) ABSTRACT

Various implementations disclosed herein include devices, systems, and methods for presenting objective-effectuators in synthesized reality settings. In various implementations, a device includes a non-transitory memory and one or more processors coupled with the non-transitory memory. In some implementations, a method includes instantiating an objective-effectuator into a synthesized reality setting. In some implementations, the objective-effectuator is characterized by a set of predefined actions and a set of visual rendering attributes. In some implementations, the method includes obtaining an objective for the objective-effectuator. In some implementations, the method includes determining contextual information characterizing the synthesized reality setting. In some implementations, the method includes generating a sequence of actions from the set of predefined actions based on the contextual information and the objective. In
(Continued)

some implementations, the method includes modifying the objective-effectuator based on the sequence of actions.

30 Claims, 11 Drawing Sheets

Related U.S. Application Data

(60) Provisional application No. 62/734,174, filed on Sep. 20, 2018, provisional application No. 62/620,336, filed on Jan. 22, 2018.

(51) Int. Cl.

| | | |
|---|---|---|
| *G06F 18/21* | (2023.01) | |
| *G06N 3/04* | (2023.01) | |
| *G06N 3/08* | (2023.01) | |
| *G06N 3/088* | (2023.01) | |
| *G06T 19/00* | (2011.01) | |
| *G06T 15/00* | (2011.01) | |

(52) U.S. Cl.
CPC ............ *G06N 3/08* (2013.01); *G06T 19/006* (2013.01); *G06T 15/005* (2013.01)

(58) Field of Classification Search
CPC ... G06F 16/951; G06F 18/217; G06T 19/006; G06T 15/005
See application file for complete search history.

(56) References Cited

U.S. PATENT DOCUMENTS

| | | | |
|---|---|---|---|
| 2008/0163054 A1 | 7/2008 | Pieper et al. | |
| 2013/0050260 A1 | 2/2013 | Reitan | |
| 2014/0267228 A1* | 9/2014 | Ofek | G06T 19/006 |
| | | | 345/419 |
| 2014/0267230 A1* | 9/2014 | Osuna | A63F 13/58 |
| | | | 345/419 |
| 2015/0126286 A1* | 5/2015 | Guo | A63F 13/55 |
| | | | 463/42 |
| 2016/0314609 A1* | 10/2016 | Taylor | A63F 13/65 |
| 2016/0330522 A1* | 11/2016 | Newell | G06F 21/604 |
| 2017/0140755 A1 | 5/2017 | Andreas et al. | |
| 2018/0286134 A1* | 10/2018 | Warhol | G06F 3/011 |
| 2018/0342069 A1* | 11/2018 | Lim | G06T 7/0008 |
| 2019/0066377 A1* | 2/2019 | Schoening | G06T 19/003 |
| 2019/0240581 A1* | 8/2019 | Walker | A63F 13/533 |

FOREIGN PATENT DOCUMENTS

| | | |
|---|---|---|
| EP | 1060772 A2 | 2/2000 |
| JP | 2006119926 A | 5/2006 |
| KR | 20170018930 A | 2/2017 |
| WO | 2015192117 A1 | 12/2015 |

OTHER PUBLICATIONS

PCT International Search Report and Written Opinion dated May 7, 2019, International Application No. PCT/US2019/014123, pp. 1-13.
Erol Gelenbe et al., "Simulating Autonomous Agents in Augmented Reality", Journal of Systems and Software, vol. 74, No. 3, Feb. 2005, pp. 255-268.
Fabio Roberto Miranda et al., "An Artificial Life Approach for the Animation of Cognitive Characters", Computers and Graphics, vol. 25, No. 6, Dec. 2001, pp. 955-964.
Office Action for corresponding Chinese Application No. 201980008679.X dated Mar. 16, 2023.
Notice of Allowance dated Dec. 14, 2022, Korean Patent Application No. 10-2020-7021377, pp. 1-7 (Including English Translation Summary of Document).
Chinese Second Office Action dated Oct. 19, 2023, Chinese Application No. 201980008679.X, pp. 1-5 (Includes English Translation of Search Report).

* cited by examiner

OBJECTIVE-EFFECTUATORS IN SYNTHESIZED REALITY SETTINGS

CROSS-REFERENCE TO RELATED APPLICATIONS

This application is a continuation of U.S. patent application Ser. No. 16/955,429, filed on Jun. 18, 2020, which is the national phase entry of Intl. Patent App. No. PCT/US2019/014123, filed on Jan. 18, 2019, which claims priority to U.S. Provisional Patent App. No. 62/734,174, filed on Sep. 20, 2018, and U.S. Provisional Patent App. No. 62/620,336, filed on Jan. 22, 2018, which are all hereby incorporated by reference in their entirety.

TECHNICAL FIELD

The present disclosure generally relates to objective-effectuators in synthesized reality settings.

BACKGROUND

Some devices are capable of generating and presenting synthesized reality settings. Some synthesized reality settings include virtual settings that are synthesized replacements of physical settings. Some synthesized reality settings include augmented settings that are modified versions of physical settings. Some devices that present synthesized reality settings include mobile communication devices such as smartphones, head-mountable displays (HMDs), eyeglasses, heads-up displays (HUDs), and optical projection systems. Most previously available devices that present synthesized reality settings are ineffective at presenting representations of certain objects. For example, some previously available devices that present synthesized reality settings are unsuitable for presenting representations of objects that are associated with an action.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
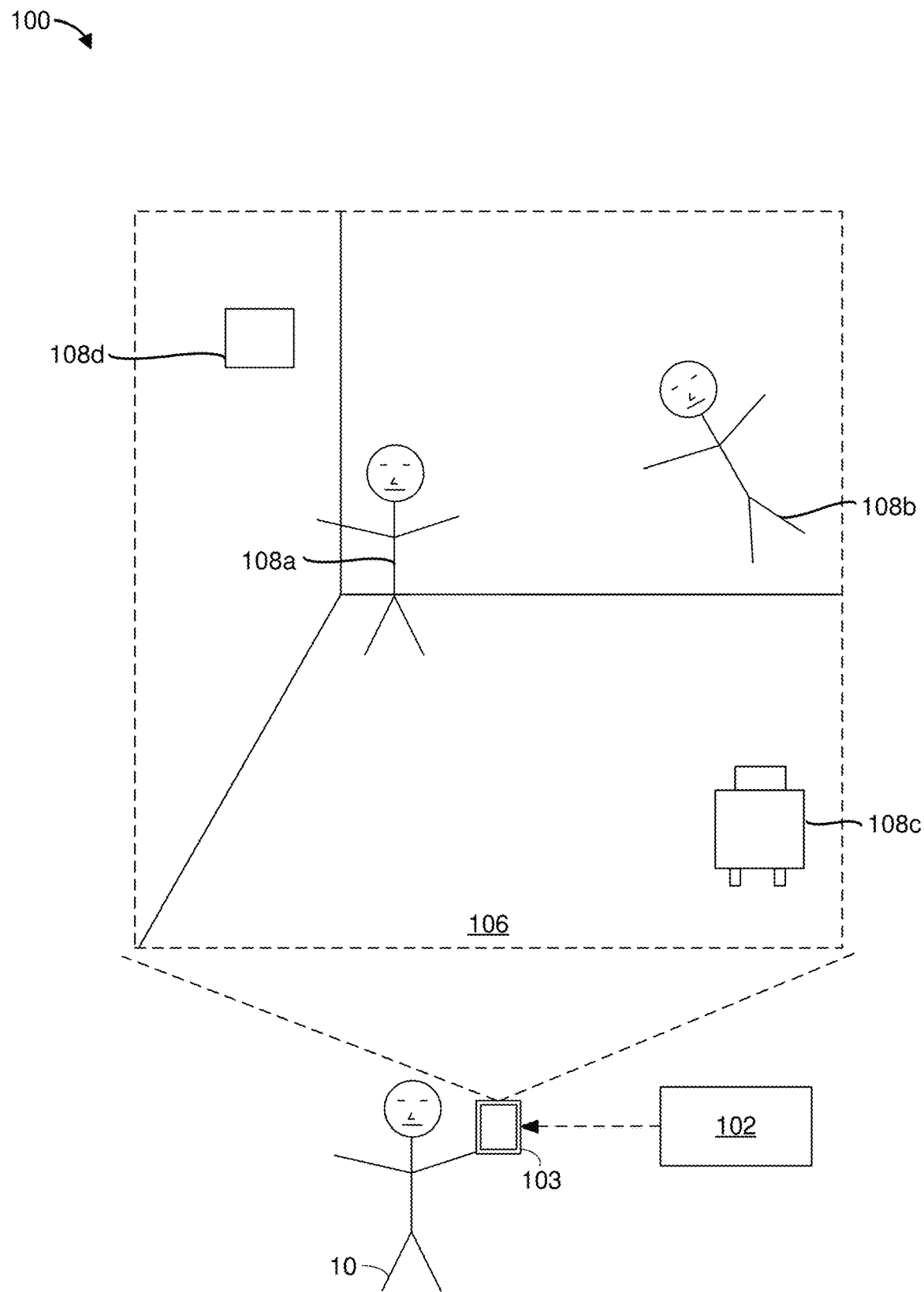
FIGS. 1A and 1B are diagrams of example operating environments in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for presenting objective-effectuators in synthesized reality settings. In various implementations, a device includes a non-transitory memory and one or more processors coupled with the non-transitory memory. In some implementations, a method includes instantiating an objective-effectuator into a synthesized reality setting. In some implementations, the objective-effectuator is characterized by a set of predefined actions and a set of visual rendering attributes. In some implementations, the method includes obtaining an objective for the objective-effectuator. In some implementations, the method includes determining contextual information characterizing the synthesized reality setting. In some implementations, the method includes generating a sequence of actions from the set of predefined actions based on the contextual information and the objective. In some implementations, the method includes modifying the objective-effectuator based on the sequence of actions.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a synthesized reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

The present disclosure provides methods, systems, and/or devices for presenting synthesized reality (SR) settings with SR representations of objective-effectuators that effectuate objectives. Some objective-effectuators represent characters and/or equipment. The characters and/or equipment are from fictional materials such as movies, video games, comics, and novels. The present disclosure provides methods for determining a sequence of actions for the objective-effectuators. The objective-effectuators are modified based on the sequence of actions in order to show the objective-effectuators performing the sequence of actions. The sequence of actions is generated based on a set of predefined actions and contextual information characterizing the synthesized reality setting.

FIG. 1A is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 102 and an electronic device 103. In the example of FIG. 1A, the electronic device 103 is being held by a user 10. In some implementations, the electronic device 103 includes a smartphone, a tablet, a laptop, or the like.

As illustrated in FIG. 1A, the electronic device 103 presents a synthesized reality setting 106. In some implementations, the synthesized reality setting 106 is generated by the controller 102 and/or the electronic device 103. In some implementations, the synthesized reality setting 106 includes a virtual reality setting. In other words, in some implementations, the synthesized reality setting 106 is synthesized by the controller 102 and/or the electronic device 103. In such implementations, the synthesized reality setting 106 is different from the physical setting where the electronic device 103 is located. In some implementations, the synthesized reality setting 106 includes an augmented reality setting. For example, in some implementations, the controller 102 and/or the electronic device 103 modify (e.g., augment) the physical setting where the electronic device 103 is located in order to generate the synthesized reality setting 106. In some implementations, the controller 102 and/or the electronic device 103 generate the synthesized reality setting 106 by simulating a replica of the physical setting where the electronic device 103 is located. In some implementations, the controller 102 and/or the electronic device 103 generate the synthesized reality setting 106 by removing and/or adding items from the synthesized replica of the physical setting where the electronic device 103 is located.

In some implementations, the synthesized reality setting 106 includes various SR representations of objective-effectuators, such as a boy action figure representation 108a, a girl action figure representation 108b, a robot representation 108c, and a drone representation 108d. In some implementations, the objective-effectuators represent characters from fictional materials, such as movies, video games, comics, and novels. For example, the boy action figure representation 108a represents a 'boy action figure' character from a fictional comic, and the girl action figure representation 108b represents a 'girl action figure' character from a fictional video game. In some implementations, the synthesized reality setting 106 includes objective-effectuators that represent characters from different fictional materials (e.g., from different movies/games/comics/novels). In various implementations, the objective-effectuators represent things (e.g., tangible objects). For example, in some implementations, the objective-effectuators represent equipment (e.g., machinery such as planes, tanks, robots, cars, etc.). In the example of FIG. 1A, the robot representation 108c represents a robot and the drone representation 108d represents a drone. In some implementations, the objective-effectuators represent things (e.g., equipment) from fictional materials. In some implementations, the objective-effectuators represent things from a physical setting, including things located inside and/or outside of the synthesized reality setting 106.

In various implementations, the objective-effectuators perform one or more actions in order to effectuate (e.g., complete/satisfy/achieve) one or more objectives. In some implementations, the objective-effectuators perform a sequence of actions. In some implementations, the controller 102 and/or the electronic device 103 determine the actions that the objective-effectuators are to perform. In some implementations, the actions of the objective-effectuators are within a degree of similarity to actions that the corresponding characters/things perform in the fictional material. In the example of FIG. 1A, the girl action figure representation 108b is performing the action of flying (e.g., because the corresponding 'girl action figure' character is capable of flying, and/or the 'girl action figure' character frequently flies in the fictional materials). In the example of FIG. 1A, the drone representation 108d is performing the action of hovering (e.g., because drones in physical settings are capable of hovering). In some implementations, the controller 102 and/or the electronic device 103 obtain the actions for the objective-effectuators. For example, in some implementations, the controller 102 and/or the electronic device 103 receive the actions for the objective-effectuators from a remote server that determines (e.g., selects) the actions.

In various implementations, an objective-effectuator performs an action in order to satisfy (e.g., complete or achieve) an objective. In some implementations, an objective-effectuator is associated with a particular objective, and the objective-effectuator performs actions that improve the likelihood of satisfying that particular objective. In some implementations, SR representations of the objective-effectuators are referred to as object representations, for example, because the SR representations of the objective-effectuators represent various objects (e.g., real objects, or fictional objects). In some implementations, an objective-effectuator representing a character is referred to as a character objective-effectuator. In some implementations, a character objective-effectuator performs actions to effectuate a character objective. In some implementations, an objective-effectuator representing an equipment is referred to as an equipment objective-effectuator. In some implementations, an equipment objective-effectuator performs actions to effectuate an equipment objective. In some implementations, an objective effectuator representing an environment is referred to as an environmental objective-effectuator. In some implementations, an environmental objective effectuator performs environmental actions to effectuate an environmental objective.

In some implementations, the synthesized reality setting 106 is generated based on a user input from the user 10. For example, in some implementations, the electronic device 103 receives a user input indicating a terrain for the synthesized reality setting 106. In such implementations, the controller 102 and/or the electronic device 103 configure the synthesized reality setting 106 such that the synthesized reality setting 106 includes the terrain indicated via the user input. In some implementations, the user input indicates environmental conditions for the synthesized reality setting 106. In such implementations, the controller 102 and/or the electronic device 103 configure the synthesized reality setting 106 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain, or snow).

In some implementations, the actions for the objective-effectuators are determined (e.g., generated) based on a user input from the user 10. For example, in some implementations, the electronic device 103 receives a user input indicating placement of the SR representations of the objective-effectuators. In such implementations, the controller 102 and/or the electronic device 103 position the SR representations of the objective-effectuators in accordance with the placement indicated by the user input. In some implementations, the user input indicates specific actions that the objective-effectuators are permitted to perform. In such implementations, the controller 102 and/or the electronic device 103 select the actions for the objective-effectuator from the specific actions indicated by the user input. In some implementations, the controller 102 and/or the electronic device 103 forgo actions that are not among the specific actions indicated by the user input.

Figure 1B:
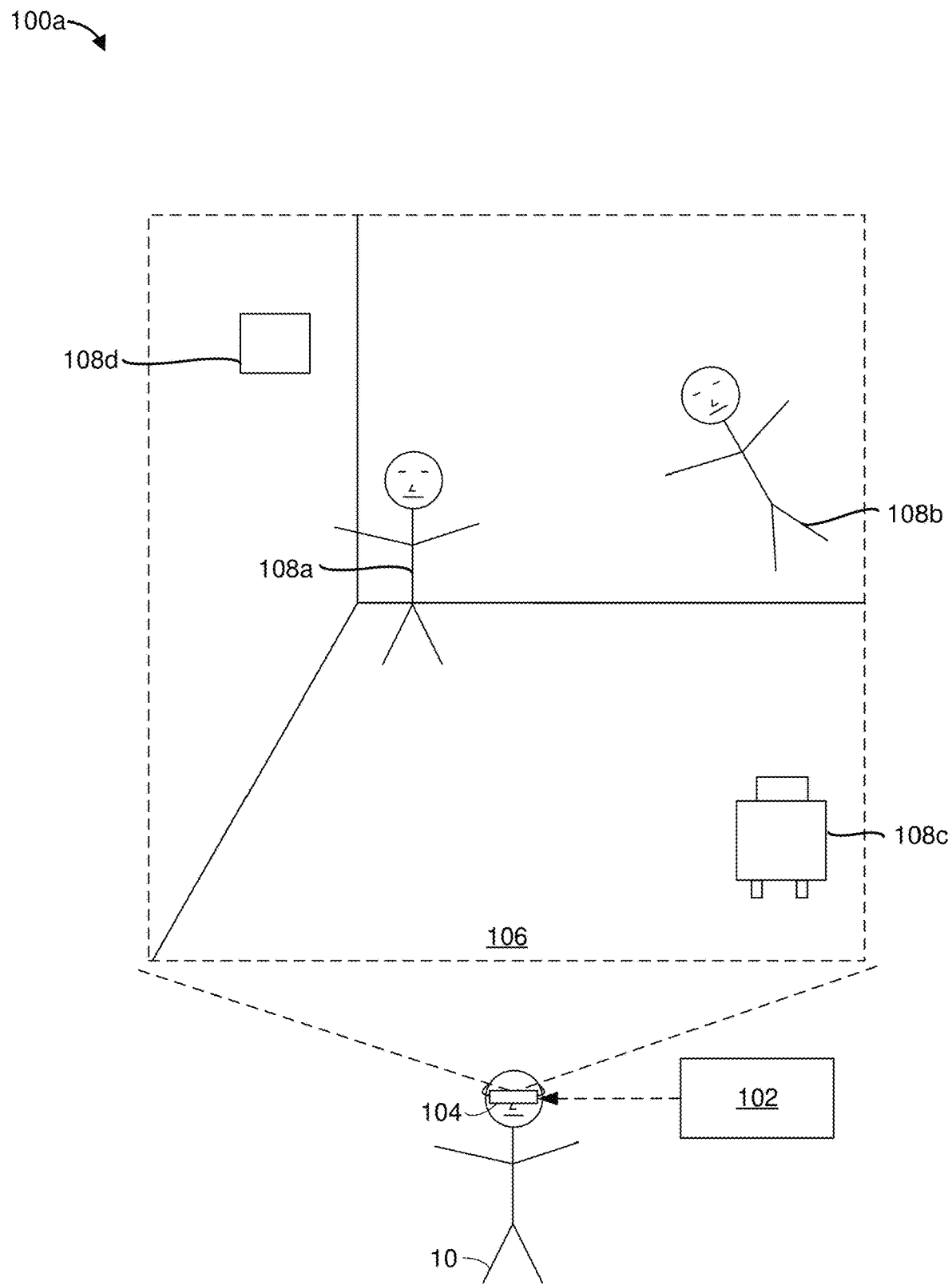

FIG. 1B is a block diagram of an example operating environment 100a in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100a includes the controller 102 and a head-mountable device (HMD) 104. In the example of FIG. 1B, the HMD 104 is worn by the user 10. In various implementations, the HMD 104 operates in substantially the same manner as the electronic device 103 shown in FIG. 1A. In some implementations, the HMD 104 performs substantially the same operations as the electronic device 103 shown in FIG. 1A. In some implementations, the HMD 104 includes a head-mountable enclosure. In some implementations, the head-mountable enclosure is shaped to form a receptacle for receiving an electronic device with a display (e.g., the electronic device 103 shown in FIG. 1A). For example, in some implementations, the electronic device 103 shown in FIG. 1A can be slid into the HMD 104. In some implementations, the HMD 104 includes an integrated display for presenting a synthesized reality experience to the user 10.

Figure 2:
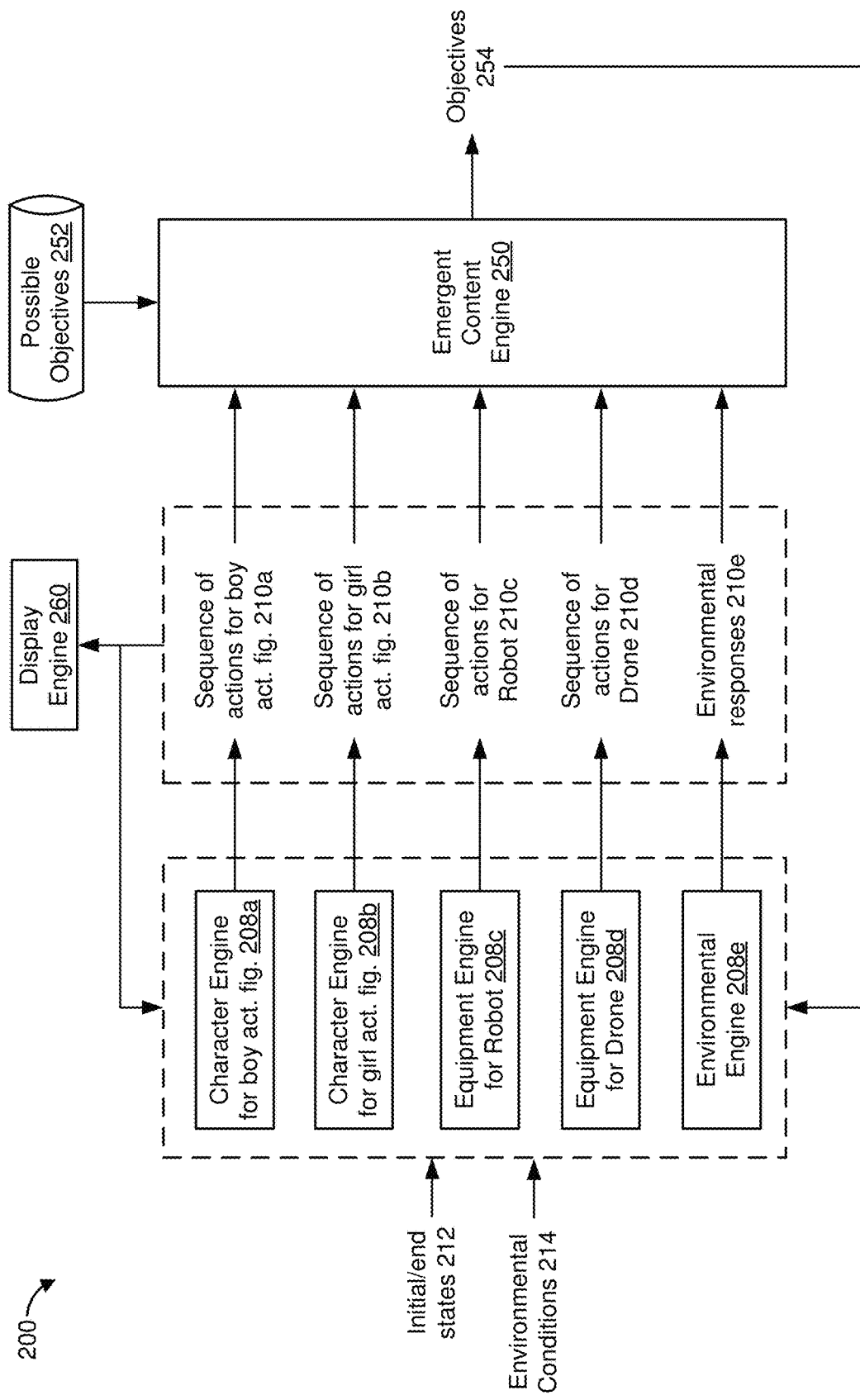
FIG. 2 is a block diagram of an example system in accordance with some implementations.

FIG. 2 is a block diagram of an example system 200 that generates actions for various objective-effectuators in a synthesized reality setting. For example, the system 200 generates actions for the boy action figure representation 108a, the girl action figure representation 108b, the robot representation 108c, and/or the drone representation 108d shown in FIG. 1A. In the example of FIG. 2, the system 200 includes a boy action figure character engine 208a that generates actions 210a for the boy action figure representation 108a, a girl action figure character engine 208b that generates actions 210b for the girl action figure representation 108b, a robot equipment engine 208c that generates actions 210c for the robot representation 108c (e.g., responses for the robot representation 108c), a drone equipment engine 208d that generates actions 210d for the drone representation 108d (e.g., responses for the drone representation 108d), and an environmental engine 208e that generates environmental responses 210e.

In some implementations, the character/equipment engines generate the actions based on initial/end states 212 for the synthesized reality setting 106. In some implementations, the synthesized reality setting 106 is associated with a time duration (e.g., a few minutes, hours or days). In some implementations, the synthesized reality setting 106 is scheduled to last for the time duration associated with the synthesized reality setting 106. In some implementations, the initial/end states 212 indicate initial/end placements of the characters/equipment. For example, in some implementations, the initial/end states 212 indicate placement of characters/equipment at the beginning of the time duration and/or at the end of the time duration associated with the synthesized reality setting 106. For example, in some implementations, the boy action figure character engine 208a places the boy action figure representation 108a at locations indicated by the initial/end states 212 at the beginning/end of the time duration associated with the synthesized reality setting 106. In some implementations, the initial/end states 212 indicate initial/end actions for the characters/equipment. In some implementations, the initial/end states 212 indicates actions that the character/equipment representations are to perform at the beginning of the time duration and/or at the end of the time duration associated with the synthesized reality setting 106. For example, in some implementations, the drone equipment engine 208d instructs the drone representation 108d to perform the actions indicated by the initial/end states 212 at the beginning/end of the time duration associated with the synthesized reality setting 106.

In some implementations, the character/equipment/environmental engines generate the actions based on environmental conditions 214. In some implementations, the environmental conditions 214 are specified by the user. In some implementations, the character/equipment engines select the actions for the characters/equipment based on the environmental conditions 214. For example, in some implementations, certain actions are not generated during some environmental conditions 214. For example, if the environmental conditions 214 indicate that it is raining in the synthesized reality setting 106, then a character that produces fire does not perform the action of producing fire. In some implementations, the environmental engine 208e generates the environmental responses 210e based on the environmental conditions 214. In some implementations, the environmental responses 210e are limited by the environmental conditions 214. For example, if the environmental conditions 214 indicate that the precipitation level in the synthesized reality setting 106 is zero, then the environmental responses 210e do not include making it rain in the synthesized reality setting 106.

In some implementations, the system 200 includes an emergent content engine 250 that generates objectives 254 for various objective-effectuators. For example, the emergent content engine 250 generates objectives 254 for the boy action figure representation 208a, the girl action figure representation 208b, the robot equipment engine 208c, the drone equipment engine 208d, and/or the environmental engine 208e. In some implementations, the emergent content engine 250 generates the objectives 254 based on a set of possible objectives 252 that are stored in a datastore. In some implementations, the possible objectives 252 are obtained from corresponding fictional source material. For example, in some implementations, the possible objectives 252 for the girl action figure representation 108b include saving lives, rescuing pets, and/or fighting crime. In some implementations, the character/equipment/environmental engines utilize the objectives 254 to generate additional actions and/or to modify previously-generated actions. For example, in some implementations, the boy action figure character engine 208a utilizes the objectives 254 to generate additional actions for the boy action figure representation 108a and/or to modify previously-generated actions for the boy action figure representation 108a.

In various implementations, the character/equipment/environmental engines provide the actions to a display engine 260 (e.g., a rendering and display pipeline). In some implementations, the display engine 260 modifies the objective-effectuators and/or the environment of the synthesized reality setting 106 based on the actions provided by the character/equipment/environmental engines. In various implementations, the display engine 260 modifies the objective-effectuators such that the objective-effectuator can be seen as performing the actions. For example, if an action for the girl action figure representation 108b is to fly, the display engine 260 moves the girl action figure representation 108b within the synthesized reality setting 106 in order to give the appearance that the girl action figure representation 108b is flying within the synthesized reality setting 106.

Figure 3A:
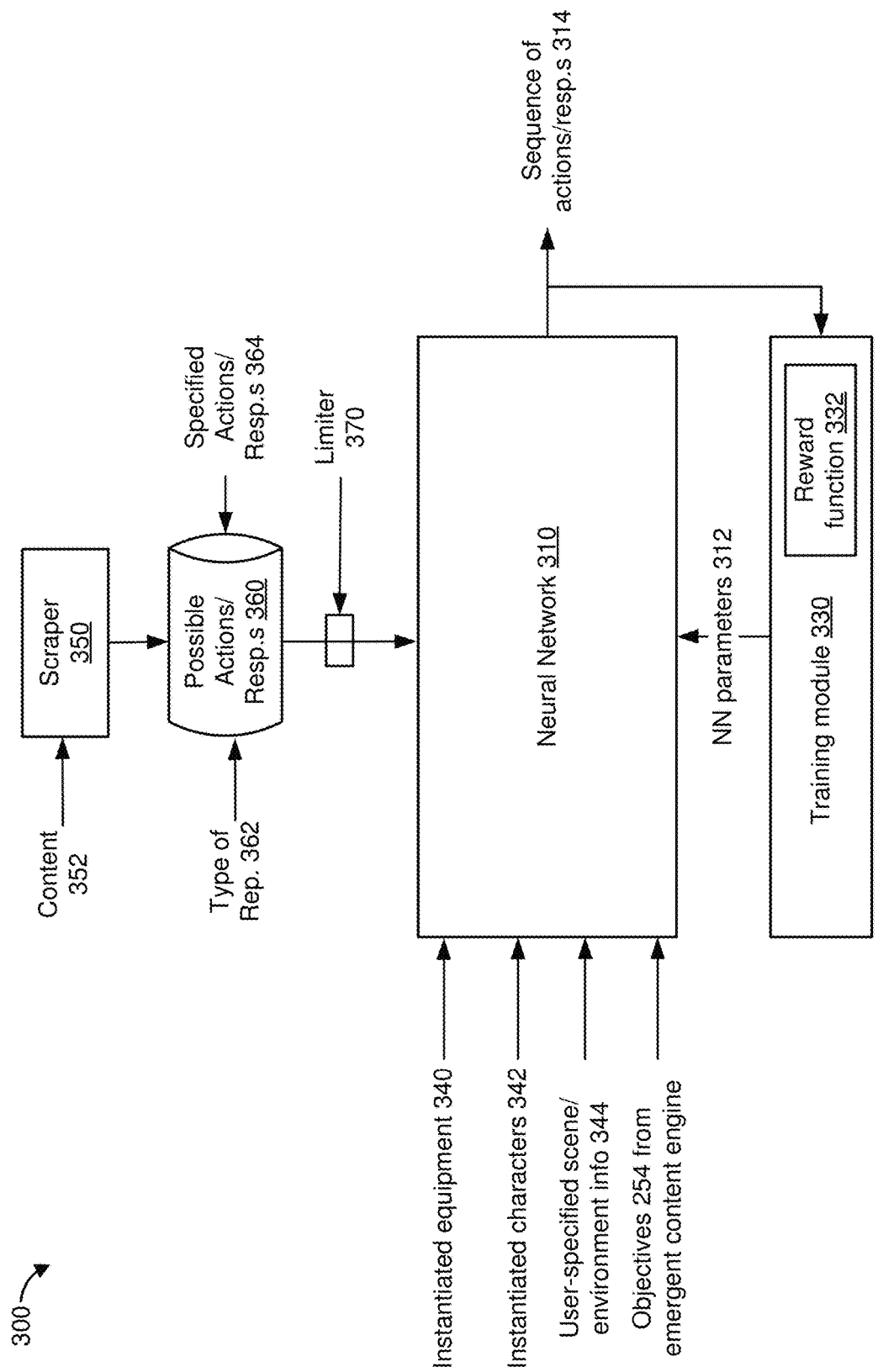
FIG. 3A is a block diagram of an example objective-effectuator engine in accordance with some implementations.

FIG. 3A is a block diagram of an example objective-effectuator engine 300 in accordance with some implementations. In some implementations, the objective-effectuator engine 300 generates actions 314 for a corresponding objective-effectuator (e.g., character objective-effectuator and/or equipment objective-effectuator, for example, the boy action figure representation 108a, the girl action figure representation 108b, the robot representation 108c, and/or the drone representation 108d). In some implementations, the boy action figure character engine 208a includes a first instance of the objective-effectuator engine 300 that generates the actions 210a for the boy action figure representation 108a. In some implementations, the girl action figure character engine 208b includes a second instance of the objective-effectuator engine 300 that generates the actions 210b for the girl action figure representation 108b. In some implementations, the robot equipment engine 208c includes a third instance of the objective-effectuator engine 300 that generates the actions 210c for the robot representation 108c. In some implementations, the drone equipment engine 208d includes a fourth instance of the objective-effectuator engine 300 that generates the actions 210d for the drone representation 108d. In various implementations, the objective-effectuator engine 300 generates the environmental responses 210e. For example, in some implementations, the environmental engine 208e includes a fifth instance of the objective-effectuator engine 300 that generates the environmental responses 210e.

In various implementations, the objective-effectuator engine 300 includes a neural network system 310 ("neural network 310", hereinafter for the sake of brevity), a neural network training system 330 ("a training module 330", hereinafter for the sake of brevity) that trains (e.g., configures) the neural network 310, and a scraper 350 that provides possible actions 360 to the neural network 310. In various implementations, the neural network 310 generates actions 314 (e.g., a sequence of actions, for example, the actions 210a/210b/210c/210d and/or the environmental responses 210e) for a corresponding objective-effectuator based on various inputs.

In some implementations, the neural network 310 includes a long short-term memory (LSTM) recurrent neural network (RNN). In various implementations, the neural network 310 generates the actions 314 based on a function of the possible actions 360. For example, in some implementations, the neural network 310 generates the actions 314 by selecting a portion of the possible actions 360. In some implementations, the neural network 310 generates the actions 314 such that the actions 314 are within a degree of similarity to the possible actions 360.

In some implementations, the neural network 310 generates the actions 314 based on instantiated equipment representations 340. In some implementations, the instantiated equipment representations 340 refers to equipment representations that are located in the synthesized reality setting. For example, referring to FIG. 1A, the instantiated equipment representations 340 include the robot representation 108c and the drone representation 108d in the synthesized reality setting 106. In some implementations, the actions 314 include interacting with one or more of the instantiated equipment representations 340. For example, referring to FIG. 1A, in some implementations, one of the actions 210b for the girl action figure representation 108b includes catching the drone representation 108d. In some implementations, one of the actions 210d for the drone representation 108d include lifting the robot representation 108c.

In some implementations, the neural network 310 generates the actions 314 based on instantiated character representations 342. In some implementations, the instantiated character representations 342 refers to character representations that are located in the synthesized reality setting. For example, referring to FIG. 1A, the instantiated character representations 342 include the boy action figure representation 108a and the girl action figure representation 108b in the synthesized reality setting 106. In some implementations, the actions 314 include interacting with one or more of the instantiated character representations 342. For example, referring to FIG. 1A, in some implementations, one of the actions 210a for the boy action figure representation 108a includes chasing the girl action figure representation 108b. In some implementations, one of the actions 210c for the robot representation 108c include listening to the boy action figure representation 108a and the girl action figure representation 108b for voice commands.

In some implementations, the neural network 310 generates the actions 314 based on user-specified scene/environment information 344. In some implementations, the user specified scene/environment information 344 includes the initial/end states 212 and/or the environmental conditions 214 shown in FIG. 2. In some implementations, the neural network 310 generates actions 314 that are a function of the initial/end states 212. In some implementations, the initial/end states 212 indicate initial/end placement for the objective-effectuator, and the neural network 310 places the objective-effectuator at the locations indicated by the initial/end states 212. In some implementations, the initial/end states 212 indicate initial/end actions for the objective-effectuator, and the neural network 310 causes the objective-effectuator to perform the actions indicated by the initial/end states 212. In some implementations, the neural network 310 selects actions that are better suited for the environment as indicated by the environmental conditions 214. For example, the neural network 310 selects a flying action for the girl action figure representation 108b when the environmental conditions 214 indicate that the skies within the synthesized reality setting are clear. In some implementations, the neural network 310 forgoes actions that are not suitable for the environment as indicated by the environmental conditions 214. For example, the neural network 310 forgoes a flying action for the drone representation 108d when the environmental conditions 214 indicate high winds within the synthesized reality setting.

In some implementations, the neural network 310 generates the actions 314 based on the objectives 254 from the emergent content engine 250. In some implementations, the neural network 310 generates the actions 314 in order to satisfy the objective 254 from the emergent content engine 250. In some implementations, the neural network 310 evaluates the possible actions 360 with respect to the objectives 254. In such implementations, the neural network 310 generates the actions 314 by selecting the possible actions 360 that satisfy the objectives 254 and forgoing selection of the possible actions 360 that do not satisfy the objectives 254.

In various implementations, the training module 330 trains the neural network 310. In some implementations, the training module 330 provides neural network (NN) parameters 312 to the neural network 310. In some implementations, the neural network 310 includes a model of neurons, and the neural network parameters 312 represent weights for the neurons. In some implementations, the training module 330 generates (e.g., initializes/initiates) the neural network parameters 312, and refines the neural network parameters 312 based on the actions 314 generated by the neural network 310.

In some implementations, the training module 330 includes a reward function 332 that utilizes reinforcement learning to train the neural network 310. In some implementations, the reward function 332 assigns a positive reward to actions 314 that are desirable, and a negative reward to actions 314 that are undesirable. In some implementations, during a training phase, the training module 330 compares the actions 314 with verification data that includes verified actions. In such implementations, if the actions 314 are within a degree of similarity to the verified actions, then the training module 330 stops training the neural network 310. However, if the actions 314 are not within the degree of similarity to the verified actions, then the training module 330 continues to train the neural network 310. In various implementations, the training module 330 updates the neural network parameters 312 during/after the training.

In various implementations, the scraper 350 scrapes content 352 to identify the possible actions 360. In some implementations, the content 352 includes movies, video games, comics, novels, and fan-created content such as blogs and commentary. In some implementations, the scraper 350 utilizes various method, systems, and devices associated with content scraping to scrape the content 352. For example, in some implementations, the scraper 350 utilizes one or more of text pattern matching, HTML (Hyper Text Markup Language) parsing, DOM (Document Object Model) parsing, image processing, and audio analysis in order to scrape the content 352 and identify the possible actions 360.

In some implementations, an objective-effectuator is associated with a type of representation 362, and the neural network 310 generates the actions 314 based on the type of representation 362 associated with the objective-effectuator. In some implementations, the type of representation 362 indicates physical characteristics of the objective-effectuator, such as characteristics relating to its appearance and/or feel (e.g., color, material type, texture, etc.). In some implementations, the neural network 310 generates the actions 314 based on the physical characteristics of the objective-effectuator. In some implementations, the type of representation 362 indicates behavioral characteristics of the objective-effectuator (e.g., aggressiveness, friendliness, etc.). In some implementations, the neural network 310 generates the actions 314 based on the behavioral characteristics of the objective-effectuator. For example, the neural network 310 generates the action of fighting for the boy action figure representation 108a in response to the behavioral characteristics including aggressiveness. In some implementations, the type of representation 362 indicates functional characteristics of the objective-effectuator (e.g., strength, speed, flexibility, etc.). In some implementations, the neural network 310 generates the actions 314 based on the functional characteristics of the objective-effectuator. For example, the neural network 310 generates a running action for the girl action figure representation 108b in response to the functional characteristics including speed. In some implementations, the type of representation 362 is determined based on a user input. In some implementations, the type of representation 362 is determined based on a combination of rules.

In some implementations, the neural network 310 generates the actions 314 based on specified actions/responses 364. In some implementations, the specified actions/responses 364 are provided by an entity that controls the fictional materials from where the character/equipment originated. For example, in some implementations, the specified actions/responses 364 are provided (e.g., conceived of) by a movie producer, a video game creator, a novelist, etc. In some implementations, the possible actions 360 include the specified actions/responses 364. As such, in some implementations, the neural network 310 generates the actions 314 by selecting a portion of the specified actions/responses 364.

In some implementations, the possible actions 360 for an objective-effectuator are limited by a limiter 370. In some implementations, the limiter 370 restricts the neural network 310 from selecting a portion of the possible actions 360. In some implementations, the limiter 370 is controlled by the entity that controls (e.g., owns) the fictional materials from where the character/equipment originated. For example, in some implementations, the limiter 370 is controlled (e.g., operated and/or managed) by a movie producer, a video game creator, a novelist, etc. In some implementations, the limiter 370 and the neural network 310 are controlled/operated by different entities. In some implementations, the limiter 370 restricts the neural network 310 from generating actions that breach a criterion defined by the entity that controls the fictional materials.

Figure 3B:
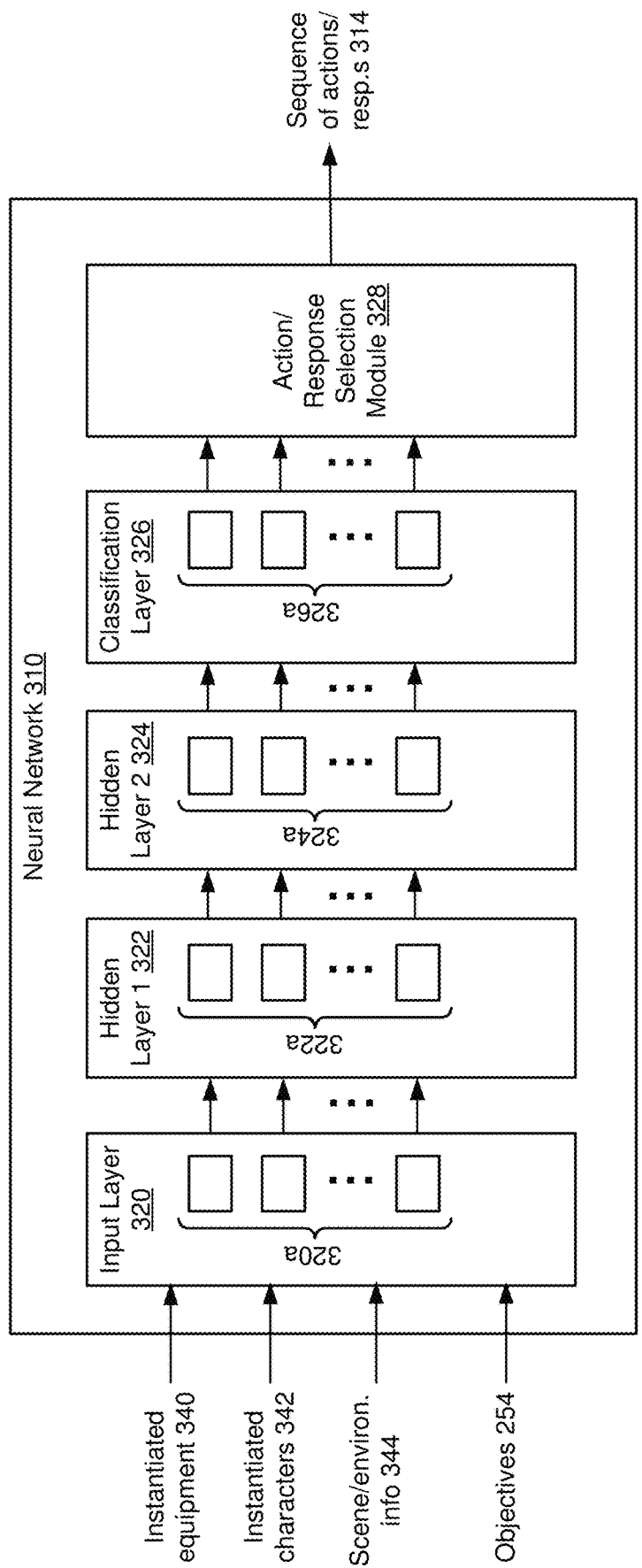
FIG. 3B is a block diagram of an example neural network in accordance with some implementations.

FIG. 3B is a block diagram of the neural network 310 in accordance with some implementations. In the example of FIG. 3B, the neural network 310 includes an input layer 320, a first hidden layer 322, a second hidden layer 324, a classification layer 326, and an action/response selection module 328 ("action selection module 328", hereinafter for the sake of brevity). While the neural network 310 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

In various implementations, the input layer 320 is coupled (e.g., configured) to receive various inputs. In the example of FIG. 3B, the input layer 320 receives inputs indicating the instantiated equipment 340, the instantiated characters 342, the user-specified scene/environment information 344, and the objectives 254 from the emergent content engine 250. In some implementations, the neural network 310 includes a feature extraction module (not shown) that generates a feature stream (e.g., a feature vector) based on the instantiated equipment 340, the instantiated characters 342, the user-specified scene/environment information 344, and/or the objectives 254. In such implementations, the feature extraction module provides the feature stream to the input layer 320. As such, in some implementations, the input layer 320 receives a feature stream that is a function of the instantiated equipment 340, the instantiated characters 342, the user-specified scene/environment information 344, and the objectives 254. In various implementations, the input layer 320 includes a number of LSTM logic units 320a, which are also referred to as model(s) of neurons by those of ordinary skill in the art. In some such implementations, an input matrix from the features to the LSTM logic units 320a include rectangular matrices. The size of this matrix is a function of the number of features included in the feature stream.

In some implementations, the first hidden layer 322 includes a number of LSTM logic units 322a. In some implementations, the number of LSTM logic units 322a ranges between approximately 10-500. Those of ordinary skill in the art will appreciate that, in such implementations, the number of LSTM logic units per layer is orders of magnitude smaller than previously known approaches (being of the order of $O(10^1)$-$O(10^2)$), which allows such implementations to be embedded in highly resource-constrained devices. As illustrated in the example of FIG. 3B, the first hidden layer 322 receives its inputs from the input layer 320.

In some implementations, the second hidden layer 324 includes a number of LSTM logic units 324a. In some implementations, the number of LSTM logic units 324a is the same as or similar to the number of LSTM logic units 320a in the input layer 320 or the number of LSTM logic units 322a in the first hidden layer 322. As illustrated in the example of FIG. 3B, the second hidden layer 324 receives its inputs from the first hidden layer 322. Additionally or alternatively, in some implementations, the second hidden layer 324 receives its inputs from the input layer 320.

In some implementations, the classification layer 326 includes a number of LSTM logic units 326a. In some implementations, the number of LSTM logic units 326a is the same as or similar to the number of LSTM logic units 320a in the input layer 320, the number of LSTM logic units 322a in the first hidden layer 322, or the number of LSTM logic units 324a in the second hidden layer 324. In some implementations, the classification layer 326 includes an implementation of a multinomial logistic function (e.g., a soft-max function) that produces a number of outputs that is approximately equal to the number of possible actions 360. In some implementations, each output includes a probability or a confidence measure that the corresponding action satisfies the objective 254. In some implementations, the outputs do not include actions that have been excluded by operation of the limiter 370.

In some implementations, the action selection module 328 generates the actions 314 by selecting the top N action candidates provided by the classification layer 326. In some implementations, the top N action candidates are most likely to satisfy the objectives 254. In some implementations, the action selection module 328 provides the actions 314 to a rendering and display pipeline (e.g., the display engine 260 shown in FIG. 2).

Figure 4A:
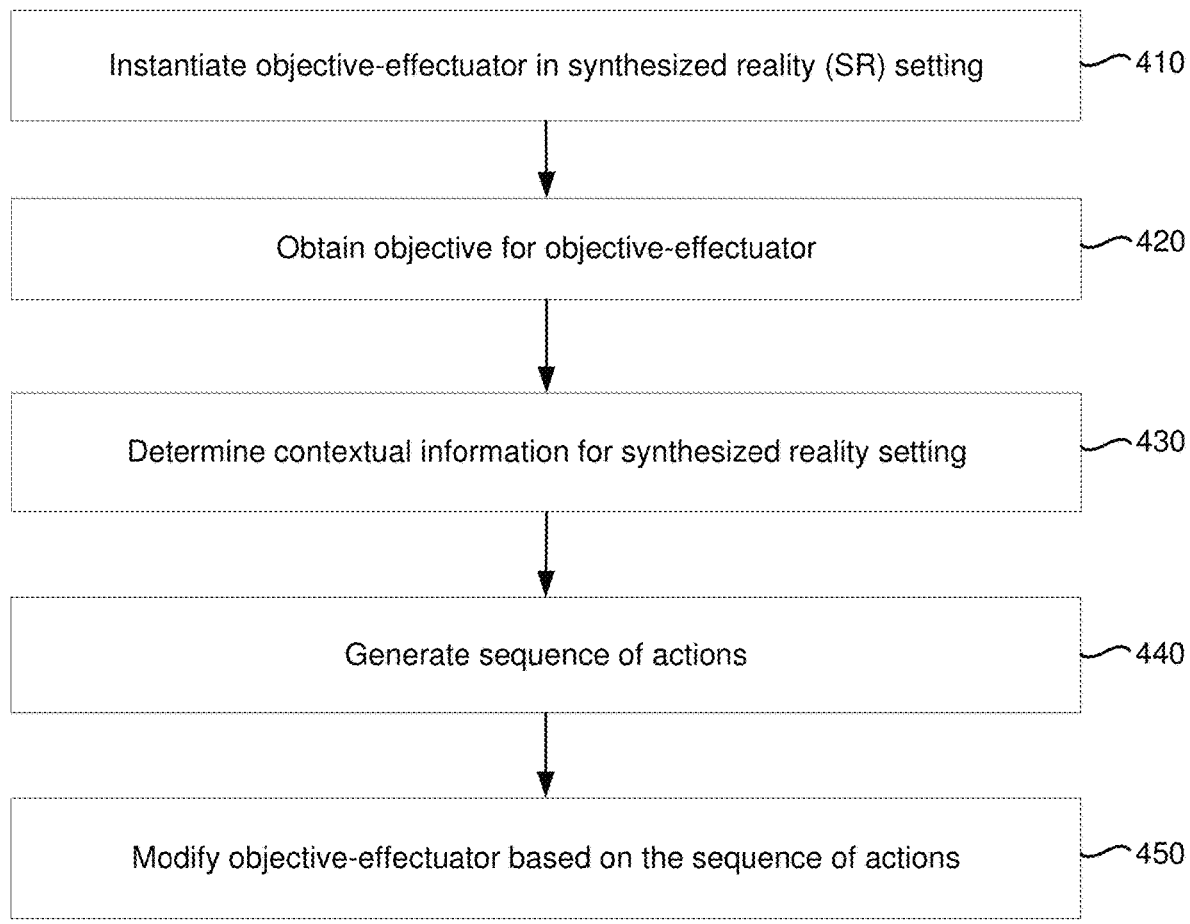
FIGS. 4A-4D are flowchart representations of a method of presenting objective-effectuators in accordance with some implementations.

FIG. 4A is a flowchart representation of a method 400 of generating and presenting objective-effectuators in a synthesized reality setting. In various implementations, the method 400 is performed by a device with a non-transitory memory and one or more processors coupled with the non-transitory memory (e.g., the controller 102 and/or the electronic device 103 shown in FIG. 1A). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in some implementations, the method 400 includes instantiating an objective-effectuator into a synthesized reality setting, obtaining an objective for the objective-effectuator, determining contextual information for the synthesized reality setting, generating a sequence of actions, and modifying the objective-effectuator based on the sequence of actions.

As represented by block 410, in various implementations, the method 400 includes instantiating an objective-effectuator into a synthesized reality setting (e.g., instantiating the boy action figure representation 108a, the girl action figure representation 108b, the robot representation 108c, and the drone representation 108d into the synthesized reality setting 106 shown in FIG. 1A). In some implementations, the objective-effectuator is characterized by a set of predefined actions (e.g., the possible actions 360 shown in FIG. 3A) and a set of visual rendering attributes.

As represented by block 420, in various implementations, the method 400 includes obtaining an objective (e.g., the objective 254 shown in FIG. 2) for the objective-effectuator. In some implementations, the method 400 includes receiving the objective from an emergent content engine (e.g., the emergent content engine 250 shown in FIG. 2).

As represented by block 430, in various implementations, the method 400 includes determining contextual information (e.g., the instantiated equipment 340, the instantiated characters 342, and/or the user-specified scene/environment information 344 shown in FIG. 3A) characterizing the synthesized reality setting.

As represented by block 440, in various implementations, the method 400 includes generating a sequence of actions (e.g., the actions 314 shown in FIGS. 3A-3B) from the set of predefined actions based on the contextual information and the objective. In various implementations, generating the sequence of actions enables the device to present dynamic objective-effectuators that perform actions without requiring a sequence of user inputs that specify the actions thereby reducing power consumption of the device and enhancing the user experience.

As represented by block 450, in various implementations, the method 400 includes modifying the objective-effectuator based on the sequence of actions. For example, in some implementations, the method 400 includes modifying the boy action figure representation 108a, the girl action figure representation 108b, the robot representation 108c, and/or the drone representation 108d shown in FIG. 1A based on the sequence of actions. In various implementations, modifying the objective-effectuator based on the sequence of actions enables the device to render synthesized reality representations of objective-effectuators that perform actions without requiring a sequence of user inputs that specify the actions thereby reducing power consumption of the device and enhancing the user experience.

Figure 4B:
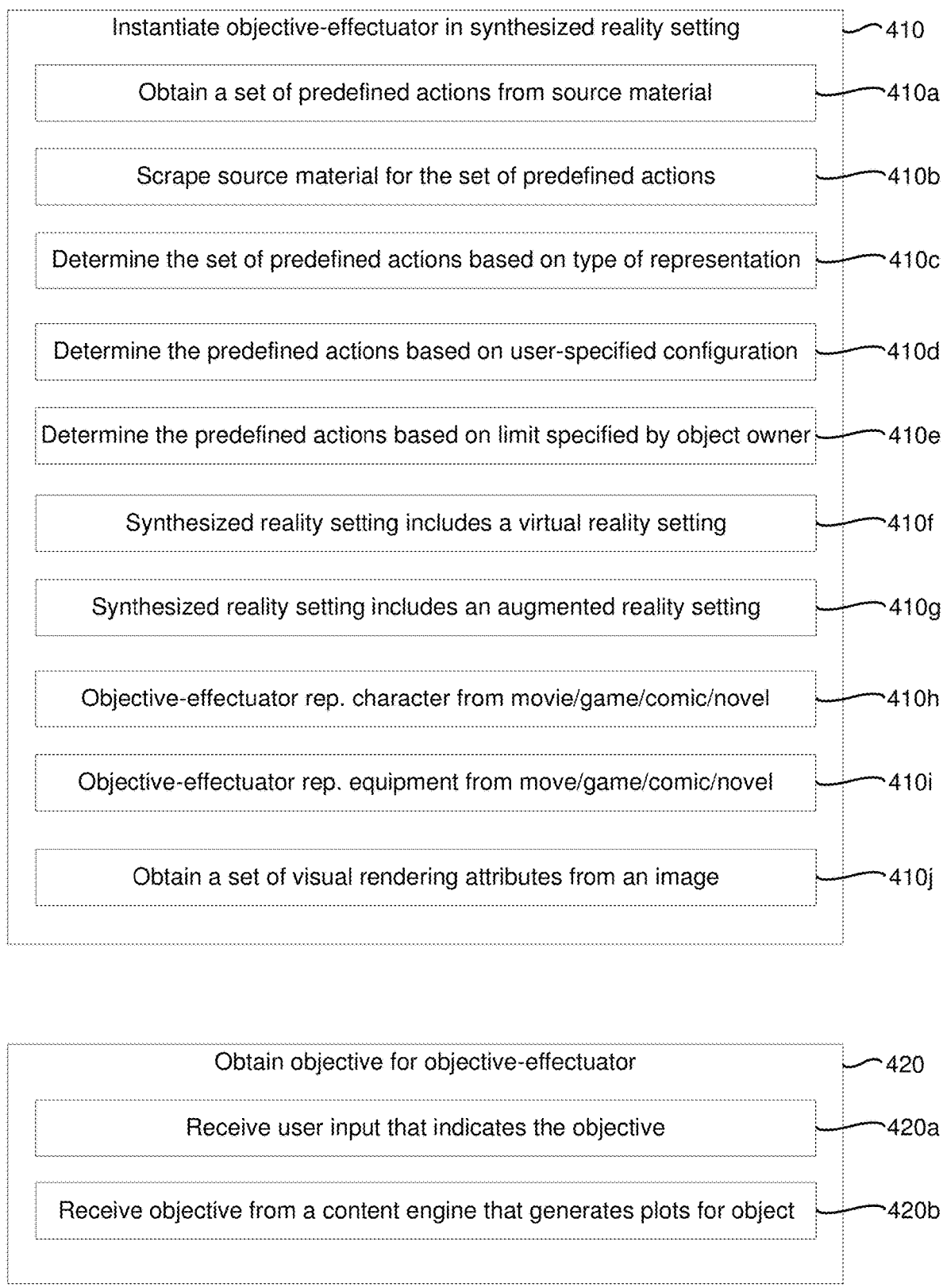

Referring to FIG. 4B, as represented by block 410a, in various implementations, the method 400 includes obtaining a set of predefined actions (e.g., the possible actions 360 shown in FIG. 3A) from source material (e.g., the content 352 shown in FIG. 3A, for example, movies, books, video games, comics, and/or novels). As represented by block 410*b*, in various implementations, the method 400 includes scraping the source material for the set of predefined actions.

As represented by block 410*c*, in some implementations, the method 400 includes determining the set of predefined actions based on a type of representation (e.g., the type of representation 362 shown in FIG. 3A). As represented by block 410*d*, in some implementations, the method 400 includes determining the set of predefined actions based on user-specified configuration (e.g., the type of representation 362 shown in FIG. 3A is determined based on a user input).

As represented by block 410*e*, in some implementations, the method 400 includes determining the predefined actions based on a limit specified by an object owner. For example, referring to FIG. 3A, in some implementations, the method 400 includes limiting the possible actions 360 selectable by the neural network 310 by operation of the limiter 370.

As represented by block 410*f*, in some implementations, the synthesized reality setting (e.g., the synthesized reality setting 106 shown in FIG. 1A) includes a virtual reality setting.

As represented by block 410*g*, in some implementations, the synthesized reality setting (e.g., the synthesized reality setting 106 shown in FIG. 1A) includes an augmented reality setting.

As represented by block 410*h*, in some implementations, the objective-effectuator is a representation of a character (e.g., the boy action figure representation 108*a* and/or the girl action figure representation 108*b* shown in FIG. 1A) from one or more of a movie, a video game, a comic, and/or a novel.

As represented by block 410*i*, in some implementations, the objective-effectuator is a representation of an equipment (e.g., the robot representation 108*c* and/or the drone representation 108*d* shown in FIG. 1A) from one or more of a movie, a video game, a comic, and/or a novel.

As represented by block 410*j*, in some implementations, the method 400 includes obtaining a set of visual rendering attributes from an image. For example, in some implementations, the method 400 includes capturing an image and extracting the visual rendering attributes from the image (e.g., by utilizing devices, methods and/or systems associated with image processing).

As represented by block 420*a*, in some implementations, the method 400 includes receiving a user input that indicates the objective. As represented by block 420*b*, in some implementations, the method 400 includes receiving the objective from a content engine that generates plots for the objective-effectuator (e.g., receiving the objective 254 from the emergent content engine 250 shown in FIG. 2).

Figure 4C:
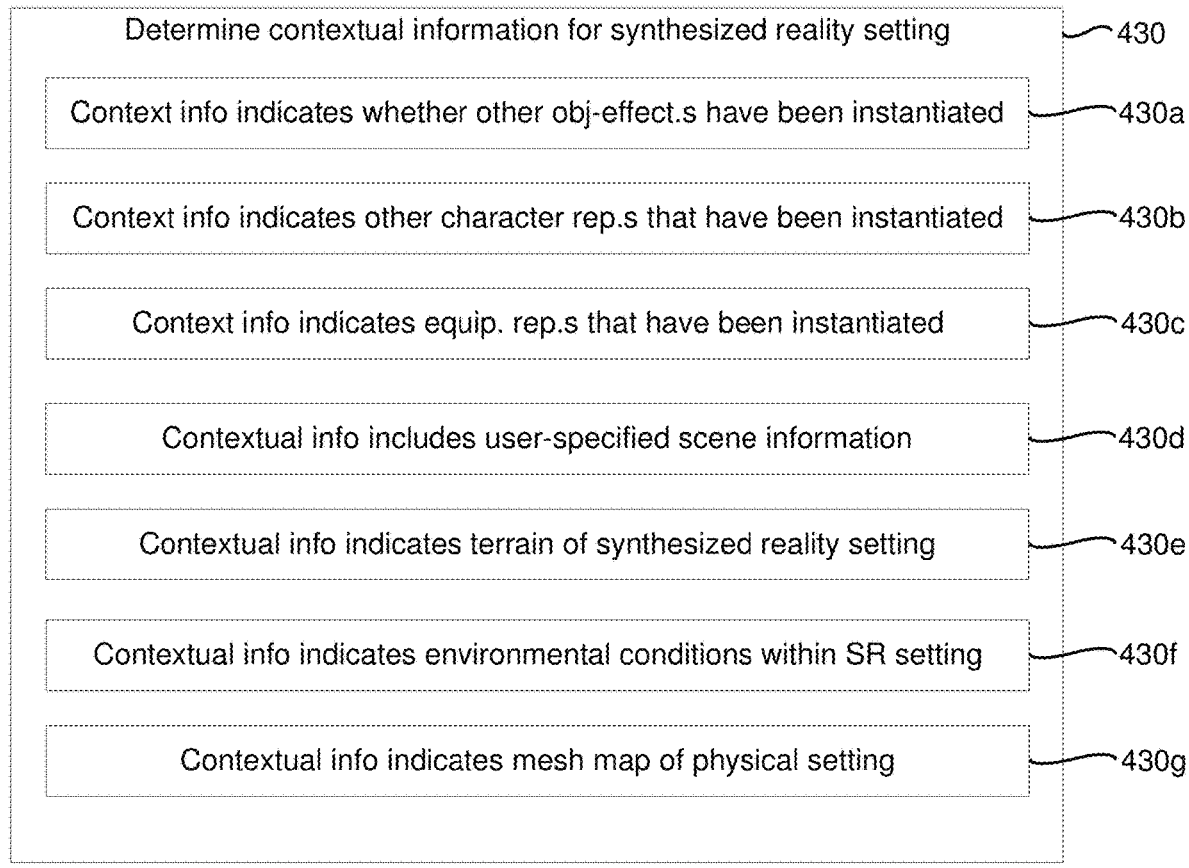

Referring to FIG. 4C, as represented by block 430*a*, in various implementations, the contextual information indicates whether objective-effectuators have been instantiated in the synthesized reality setting. As represented by block 430*b*, in some implementations, the contextual information indicates whether other character representations have been instantiated in the synthesized reality setting (e.g., the contextual information includes the instantiated characters 342 shown in FIGS. 3A-3B). As represented by block 430*c*, in some implementations, the contextual information indicates whether other equipment representations have been instantiated in the synthesized reality setting (e.g., the contextual information includes the instantiated equipment 340 shown in FIGS. 3A-3B).

As represented by block 430*d*, in various implementations, the contextual information includes user-specified scene information (e.g., user-specified scene/environment information 344 shown in FIGS. 3A-3B, for example, the initial/end states 212 and/or the environmental conditions 214 shown in FIG. 2). As represented by block 430*e*, in various implementations, the contextual information indicates a terrain (e.g., a landscape, for example, natural artifacts such as mountains, rivers, etc.) of the synthesized reality setting. As represented by block 430*f*, in various implementations, the contextual information indicates environmental conditions within the synthesized reality setting (e.g., the user-specified scene/environmental information 344 shown in FIGS. 3A-3B, for example, the environmental conditions 214 shown in FIG. 2).

As represented by block 430*g*, in some implementations, the contextual information includes a mesh map of a physical setting (e.g., a detailed representation of the physical setting where the device is located). In some implementations, the mesh map indicates positions and/or dimensions of real objects that are located in the physical setting. More generally, in various implementations, the contextual information includes data corresponding to a physical setting. For example, in some implementations, the contextual information includes data corresponding to a physical setting in which the device is located. In some implementations, the contextual information indicates a bounding surface of the physical setting (e.g., a floor, walls, and/or a ceiling). In some implementations, data corresponding to the physical setting is utilized to synthesize/modify a SR setting. In some implementations, the SR setting include SR representations of real objects that are located in the physical setting. For example, the SR setting includes SR representations of walls that exist in the physical setting.

Figure 4D:
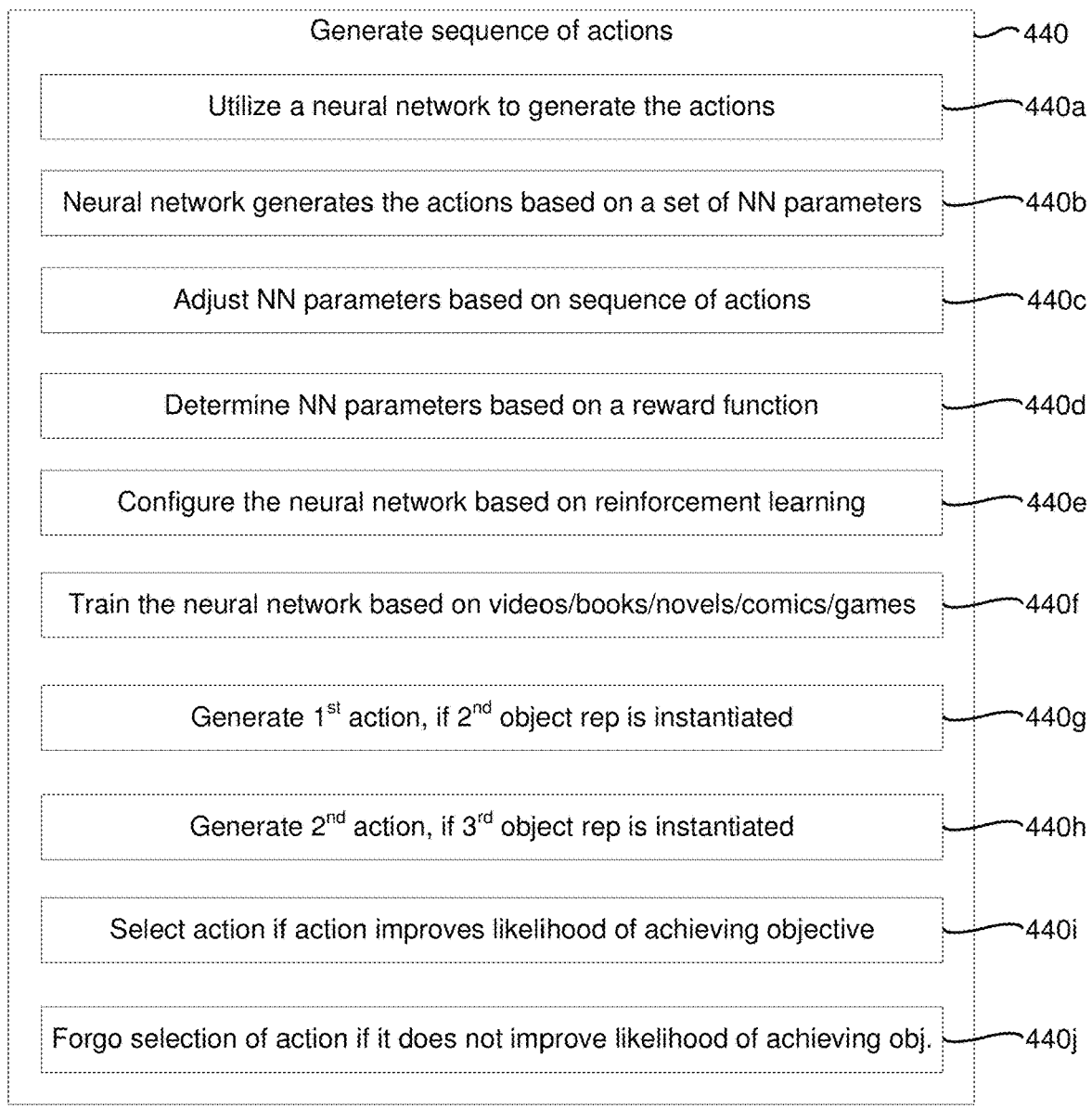

Referring to FIG. 4D, as represented by block 440*a*, in some implementations, the method 400 includes utilizing a neural network (e.g., the neural network 310 shown in FIGS. 3A-3B) to generate the sequence of actions. As represented by block 440*b*, in some implementations, the neural network generates the actions based on a set of neural network parameters (e.g., the neural network parameters 312 shown in FIG. 3A). As represented by block 440*c*, in some implementations, the method 400 includes adjusting the neural network parameters based on the sequence of actions (e.g., adjusting the neural network parameters 312 based on the actions 314 shown in FIG. 3B).

As represented by block 440*d*, in some implementations, the method 400 includes determining neural network parameters based on a reward function (e.g., the reward function 332 shown in FIG. 3A) that assigns a positive reward to desirable actions and a negative reward to undesirable actions. As represented by block 440*e*, in some implementations, the method 400 includes configuring (e.g., training) the neural network based on reinforcement learning. As represented by block 440*f*, in some implementations, the method 400 includes training the neural network based on content scraped (e.g., by the scraper 350 shown in FIG. 3A) from videos such as movies, books such as novels and comics, and video games.

As represented by block 440*g*, in some implementations, the method 400 includes generating a first action, if a second objective-effectuator is instantiated in the synthesized reality setting. As represented by block 440*h*, in some implementations, the method 400 includes generating a second action, if a third objective-effectuator is instantiated in the synthesized reality setting.

As represented by block 440*i*, in some implementations, the method 400 includes selecting an action if the action improves the likelihood of achieving the objective. As represented by block 440*j*, in some implementations, the method 400 includes forgoing selecting of an action if the action does not improve the likelihood of achieving the objective.

As represented by block 450a, in some implementations, the method 400 includes providing the actions to a rendering and display pipeline (e.g., the display engine 260 shown in FIG. 2). As represented by block 450b, in some implementations, the method 400 includes modifying the objective-effectuator such that the objective-effectuator can be seen as performing the actions.

Figure 5:
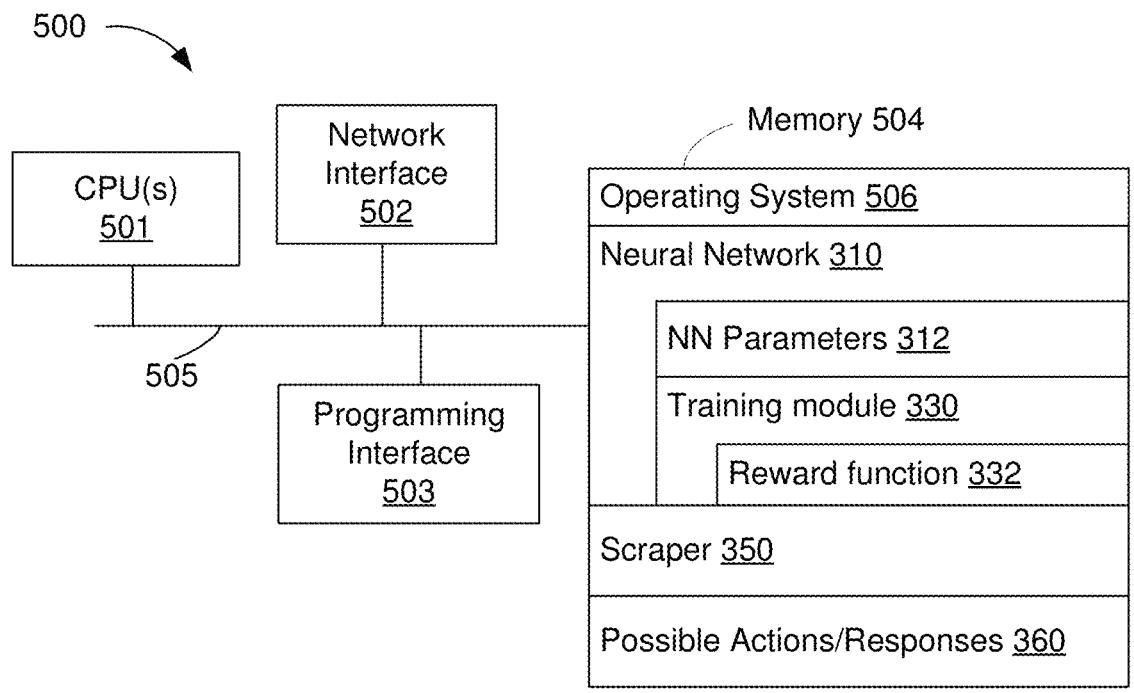
FIG. 5 is a block diagram of a server system enabled with various components of the objective-effectuator engine in accordance with some implementations.

FIG. 5 is a block diagram of a server system 500 enabled with one or more components of a device (e.g., the controller 102 and/or the electronic device 103 shown in FIG. 1A) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 500 includes one or more processing units (CPUs) 501, a network interface 502, a programming interface 503, a memory 504, and one or more communication buses 505 for interconnecting these and various other components.

In some implementations, the network interface 502 is provided to, among other uses, establish and maintain a metadata tunnel between a cloud hosted network management system and at least one private network including one or more compliant devices. In some implementations, the communication buses 505 include circuitry that interconnects and controls communications between system components. The memory 504 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 504 optionally includes one or more storage devices remotely located from the CPU(s) 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, the neural network 310, the training module 330, the scraper 350, and the possible actions 360. As described herein, the neural network 310 is associated with the neural network parameters 312. As described herein, the training module 330 includes a reward function 332 that trains (e.g., configures) the neural network 310 (e.g., by determining the neural network parameters 312). As described herein, the neural network 310 determines a sequence of actions (e.g., the actions 314 shown in FIGS. 3A-3B) for an objective-effectuator.

Figure 6:
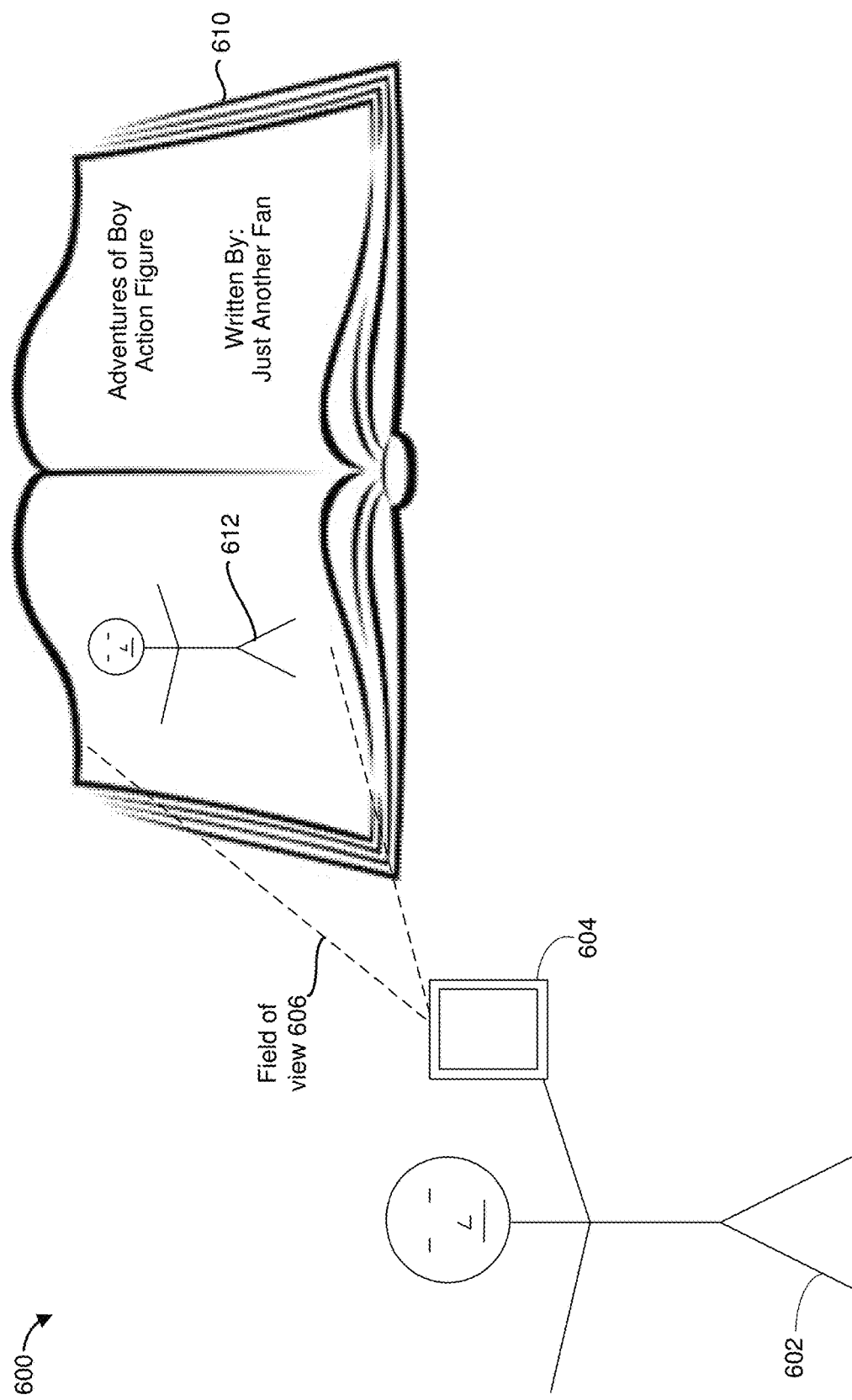
FIG. 6 is a diagram of a character being captured in accordance with some implementations.

FIG. 6 is a diagram that illustrates an environment 600 in which a character is being captured. To that end, the environment 600 includes a hand 602 holding a device 604, and fictional material 610. In the example of FIG. 6, the fictional material 610 includes a book, a novel, or a comic that is about the boy action figure. The fictional material 610 includes a picture 612 of the boy action figure. In operation, the user holds the device 604 such that the picture 612 is within a field of view 606 of the device 604. In some implementations, the device 604 captures an image that includes the picture 612 of the boy action figure.

In some implementations, the picture 612 includes encoded data (e.g., a barcode) that identifies the boy action figure. For example, in some implementations, the encoded data specifies that the picture 612 is of the boy action figure from the fictional material 610. In some implementations, the encoded data includes a uniform resource locator (URL) that directs the device 604 to a resource that includes information regarding the boy action figure. For example, in some implementations, the resource includes various physical and/or behavioral attributes of the boy action figures. In some implementations, the resource indicates objectives for the boy action figure.

In various implementations, the device 604 presents an objective-effectuator of the boy action figure in a synthesized reality setting (e.g., in the synthesized reality setting 106 shown in FIG. 1A). FIG. 6 illustrates a non-limiting example of capturing a character. In some implementations, the device 604 captures characters and/or equipment based on audio input. For example, in some implementations, the device 604 receives an audio input that identifies the boy action figure. In such implementations, the device 604 queries a datastore of characters and equipment to identify the character/equipment specified by the audio input.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a non-transitory memory, a display, and one or more processors coupled with the non-transitory memory:
while presenting a synthesized reality setting on the display:
instantiating an objective-effectuator into the synthesized reality setting, wherein the objective-effectuator is characterized by a set of predefined actions and a set of visual rendering attributes, and the objective-efffectuator represents a character from a source material;
obtaining an objective for the objective-effectuator;
determining contextual information characterizing the synthesized reality setting at least in part by determining a mapping between the synthesized reality setting and a physical setting in which the device is located;
generating a sequence of actions from the set of predefined actions based on the contextual information and the objective, wherein the actions in the sequence of actions are within a degree of similarity to actions that the character performs in the source material; and
manipulating the objective-effectuator to perform the sequence of actions.

2. The method of claim 1, wherein generating the sequence of actions comprises utilizing a neural network to generate the sequence of actions.

3. The method of claim 2, wherein the neural network generates the sequence of actions based on a set of neural network parameters.

4. The method of claim 3, further comprising:
adjusting the set of neural network parameters based on the sequence of actions.

5. The method of claim 3, further comprising:
determining the set of neural network parameters based on a reward function that assigns positive rewards to desirable actions and negative rewards to undesirable actions.

6. The method of claim 2, further comprising:
configuring the neural network based on reinforcement learning.

7. The method of claim 2, further comprising:
training the neural network based on one or more of videos, novels, books, comics, and video games associated with the objective-effectuator.

8. The method of claim 1, wherein manipulating the objective-effectuator comprises:
providing the sequence of actions to a display pipeline in order to output synthesized reality content showing the objective-effectuator performing the sequence of actions within the synthesized reality setting.

9. The method of claim 1, further comprising:
obtaining the set of predefined actions from the source material including one or more of movies, video games, comics, and novels.

10. The method of claim 9, wherein obtaining the set of predefined actions comprises scraping the source material to extract the set of predefined actions; and
wherein generating the sequence of actions comprises selecting the actions in the sequence from the set of predefined actions.

11. The method of claim 9, wherein obtaining the set of predefined actions comprises:
determining the set of predefined actions based on a type of the objective-effectuator that is instantiated.

12. The method of claim 9, wherein obtaining the set of predefined actions comprises:
determining the set of predefined actions based on a user-specified configuration of the objective-effectuator.

13. The method of claim 9, wherein obtaining the set of predefined actions comprises:
determining the set of predefined actions based on limits specified by an entity that owns the object.

14. The method of claim 1, further comprising:
capturing an image; and
obtaining the set of visual rendering attributes from the image.

15. The method of claim 1, wherein obtaining the objective comprises:
receiving a user input that indicates the objective.

16. The method of claim 1, wherein obtaining the objective comprises:
receiving the objective from a content engine that generates plots for the object.

17. The method of claim 1, wherein the contextual information indicates whether other objective-effectuators have been instantiated within the synthesized reality setting.

18. The method of claim 1, wherein generating the sequence of actions comprises:
generating a first action in response to the contextual information indicating that a second objective-effectuator has been instantiated within the synthesized reality setting; and
generating a second action that is different from the first action in response to the contextual information indicating that a third objective-effectuator has been instantiated within the synthesized reality setting.

19. A device comprising:
one or more processors;
a non-transitory memory;
one or more displays; and
one or more programs stored in the non-transitory memory, which, when executed by the one or more processors, cause the device to:
while presenting a synthesized reality setting on the one or more displays:
instantiate an objective-effectuator into the synthesized reality setting, wherein the objective-effectuator is characterized by a set of predefined actions and a set of visual rendering attributes, and the objective-efffectuator represents a character from a source material;
obtain an objective for the objective-effectuator;
determine contextual information characterizing the synthesized reality setting at least in part by determining a mapping between the synthesized reality setting and a physical setting in which the device is located;

generate a sequence of actions from the set of predefined actions based on the contextual information and the objective, wherein the actions in the sequence of actions are within a degree of similarity to actions that the character performs in the source material; and manipulate the objective-effectuator to perform the sequence of actions.

20. The device of claim 19, wherein the one or more programs, which, when executed by the one or more processors, further cause the device to:

obtain the set of predefined actions from the source material including one or more of movies, video games, comics, and novels.

21. The device of claim 19, wherein obtaining the objective comprises:

receiving the objective from a content engine that generates plots for the object.

22. The device of claim 19, wherein the contextual information indicates whether other objective-effectuators have been instantiated within the synthesized reality setting.

23. The device of claim 19, wherein generating the sequence of actions comprises:

generating a first action in response to the contextual information indicating that a second objective-effectuator has been instantiated within the synthesized reality setting; and generating a second action that is different from the first action in response to the contextual information indicating that a third objective-effectuator has been instantiated within the synthesized reality setting.

24. A non-transitory memory storing one or more programs, which, when executed by one or more processors of a device with a display, cause the device to:

while presenting a synthesized reality setting on the display:

instantiate an objective-effectuator into the synthesized reality setting, wherein the objective-effectuator is characterized by a set of predefined actions and a set of visual rendering attributes, and the objective-efffectuator represents a character from a source material;

obtain an objective for the objective-effectuator;

determine contextual information characterizing the synthesized reality setting at least in part by determining a mapping between the synthesized reality setting and a physical setting in which the device is located;

generate a sequence of actions from the set of predefined actions based on the contextual information and the objective, wherein the actions in the sequence of actions are within a degree of similarity to actions that the character performs in the source material; and manipulate the objective-effectuator to perform the sequence of actions.

25. The non-transitory memory of claim 24, wherein generating the sequence of actions comprises utilizing a neural network to generate the sequence of actions.

26. The non-transitory memory of claim 25, wherein the neural network generates the sequence of actions based on a set of neural network parameters.

27. The non-transitory memory of claim 26, wherein the one or more programs, which, when executed by the one or more processors of the device with the display, further cause the device to:

adjust the set of neural network parameters based on a reward function that assigns positive rewards to desirable actions and negative rewards to undesirable actions.

28. The non-transitory memory of claim 26, wherein the one or more programs, which, when executed by the one or more processors of the device with the display, further cause the device to:

determine the set of neural network parameters based on a reward function that assigns positive rewards to desirable actions and negative rewards to undesirable actions.

29. The non-transitory memory of claim 25, wherein the one or more programs, which, when executed by the one or more processors of the device with the display, further cause the device to:

train the neural network based on one or more of videos, novels, books, comics, and video games associated with the objective-effectuator.

30. The non-transitory memory of claim 24, wherein manipulating the objective- effectuator comprises:

providing the sequence of actions to a display pipeline in order to output synthesized reality content showing the objective-effectuator performing the sequence of actions within the synthesized reality setting.

* * * * *